United States Patent
Gunna et al.

(10) Patent No.: US 8,131,946 B2
(45) Date of Patent: *Mar. 6, 2012

(54) CONVERTING VICTIM WRITEBACK TO A FILL

(75) Inventors: Ramesh Gunna, San Jose, CA (US); Sudarshan Kadambi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/908,535

(22) Filed: Oct. 20, 2010

(65) Prior Publication Data

US 2011/0047336 A1     Feb. 24, 2011

Related U.S. Application Data

(63) Continuation of application No. 11/758,275, filed on Jun. 5, 2007, now Pat. No. 7,836,262.

(51) Int. Cl.
*G06F 12/00* (2006.01)

(52) U.S. Cl. ........ 711/143; 711/122; 711/134; 711/133; 711/118; 711/151; 711/E12.043; 712/207

(58) Field of Classification Search .................. None
See application file for complete search history.

(56) References Cited

U.S. PATENT DOCUMENTS

| | | | |
|---|---|---|---|
| 5,008,886 A | 4/1991 | Chinnaswamy et al. | |
| 5,235,693 A | 8/1993 | Chinnaswamy et al. | |
| 5,860,112 A | 1/1999 | Langendorf et al. | |
| 5,860,117 A | 1/1999 | Cherabuddi | |
| 5,944,815 A | 8/1999 | Witt | |
| 6,473,832 B1 | 10/2002 | Ramagopal et al. | |
| 6,473,837 B1 | 10/2002 | Hughes et al. | |
| 6,477,622 B1 | 11/2002 | Normoyle et al. | |
| 6,959,367 B2 | 10/2005 | Banno | |
| 2002/0169930 A1 | 11/2002 | Hagiwara | |
| 2003/0110356 A1 | 6/2003 | Williams, III | |
| 2004/0103251 A1 | 5/2004 | Alsup | |
| 2005/0138292 A1 | 6/2005 | Sullivan | |
| 2006/0155934 A1 | 7/2006 | Rajamony et al. | |

OTHER PUBLICATIONS

Mark Hayter, "Zen and the Art of SOC Design," Microprocessor Summit 2006, Session MPS-960 High End Processors, P.A. Semi, Inc., 14 pages.
James B. Keller, "The PWRficient Processor Family," PA Semi, Oct. 2005, 31 pages.
U.S. Appl. No. 11/758,303, filed Jun. 5, 2007.

*Primary Examiner* — Reginald Bragdon
*Assistant Examiner* — Arvind Talukdar
(74) *Attorney, Agent, or Firm* — Lawrence J. Merkel; Meyertons, Hood, Kivlin, Kowert & Goetzel, P.C.

(57) ABSTRACT

In one embodiment, a processor may be configured to write ECC granular stores into the data cache, while non-ECC granular stores may be merged with cache data in a memory request buffer. In one embodiment, a processor may be configured to detect that a victim block writeback hits one or more stores in a memory request buffer (or vice versa) and may convert the victim block writeback to a fill. In one embodiment, a processor may speculatively issue stores that are subsequent to a load from a load/store queue, but prevent the update for the stores in response to a snoop hit on the load.

15 Claims, 5 Drawing Sheets

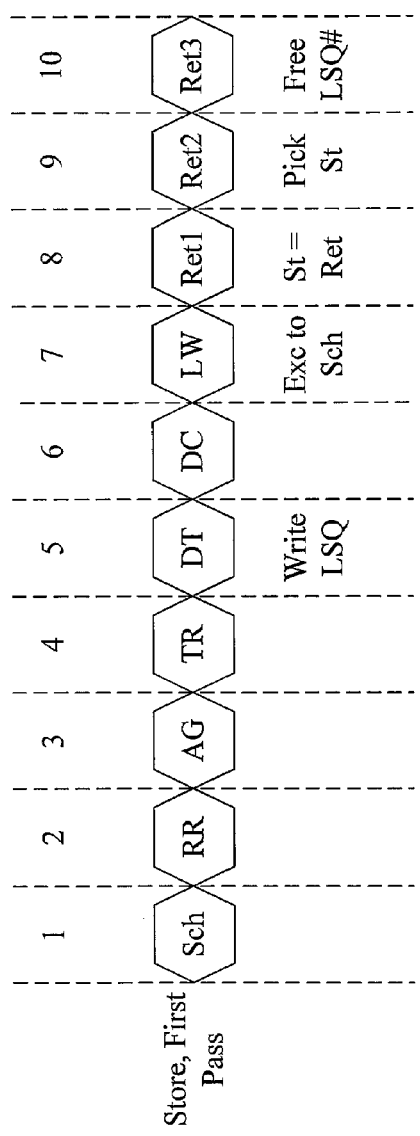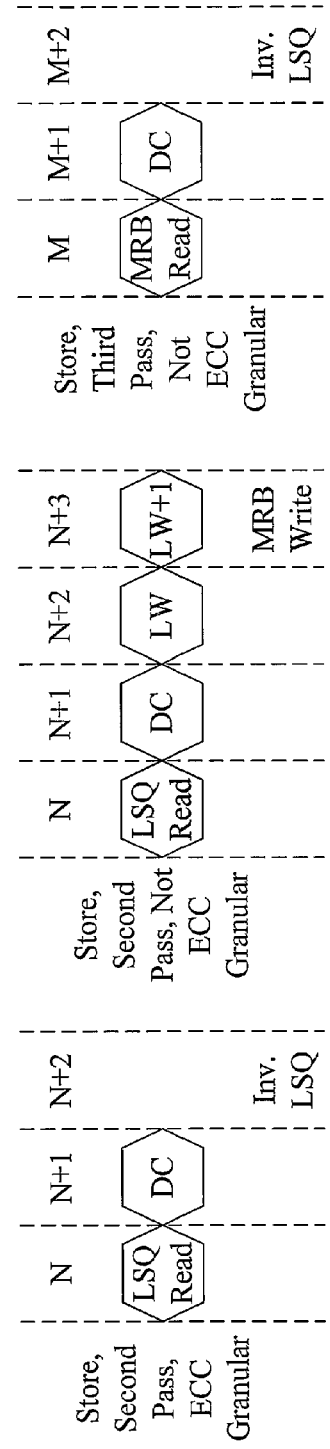

CONVERTING VICTIM WRITEBACK TO A FILL

This application is a continuation of U.S. application Ser. No. 11/758,275, now U.S. Pat. No. 7,836,262 which was filed on Jun. 5, 2007.

BACKGROUND

1. Field of the Invention

This invention is related to the field of processors and, more particularly, to the handling of store memory operations in processors.

2. Description of the Related Art

Processors generally include support for load and store memory operations to facilitate transfer of data between the processors and memory to which the processors may be coupled. A load memory operation (or, more briefly, a load) is a memory operation specifying a transfer of data from a main memory to the processor (although the transfer may be completed in cache). A store memory operation (or, more briefly, a store) is a memory operation specifying a transfer of data from the processor to memory.

Stores are often executed and placed in a queue within a load/store unit to await non-speculative status. Once a store is non-speculative, the corresponding store data can be committed to memory (in cache or in the main memory system) and then the store can be retired. Typically, store data can be forwarded from the queue for subsequent loads that access one or more bytes updated by the store. Accordingly, committing the store data to memory and retiring the store operations are typically given a low priority in the processor. In many cases, the store may become the oldest operation outstanding in the processor before retiring.

Unfortunately, the low priority for committing store data (and the latency for committing the store data, once the store is ready to commit) can impact the performance of the processor. For example, processors typically retire instructions in program order. Accordingly, if a store has not been retired, younger instructions (according to the program order) also cannot be retired. Buffering for such instructions and/or their results may fill, which may cause stalls in instruction execution until the buffering can be reduced from full status. An instruction is younger than another instruction if it is subsequent to the other instruction in program order. An instruction is older than another instruction if the instruction is prior to the other instruction in program order. Similarly, instructions may be indicated as being prior to or subsequent to other instructions, or may be referred to as previous instructions, preceding instructions, subsequent instructions, etc. Such references may refer to the program order of the instructions. The program order at any given point in time may be a predicted order (e.g. via branch prediction schemes).

SUMMARY

In one embodiment, a processor comprises a data cache and an interface unit comprising a memory request buffer coupled to receive a victim block evicted by the data cache to be written back to memory. The interface unit is configured to convert the victim block writeback into a cache fill for the data cache responsive to detecting at least one store memory operation to the victim block.

BRIEF DESCRIPTION OF THE DRAWINGS

The following detailed description makes reference to the accompanying drawings, which are now briefly described.

FIG. 3 is a timing diagram illustrating pipeline stages of processing a store for one embodiment.

FIG. 4 is a timing diagram illustrating pipeline stages of processing an ECC granular store in a second pass for one embodiment.

FIG. 5 is a timing diagram illustrating pipeline stages of processing a non-ECC granular store in a second pass for one embodiment.

FIG. 6 is a timing diagram illustrating pipeline stages of processing a non-ECC granular store in a third pass for one embodiment.

Figure 1:
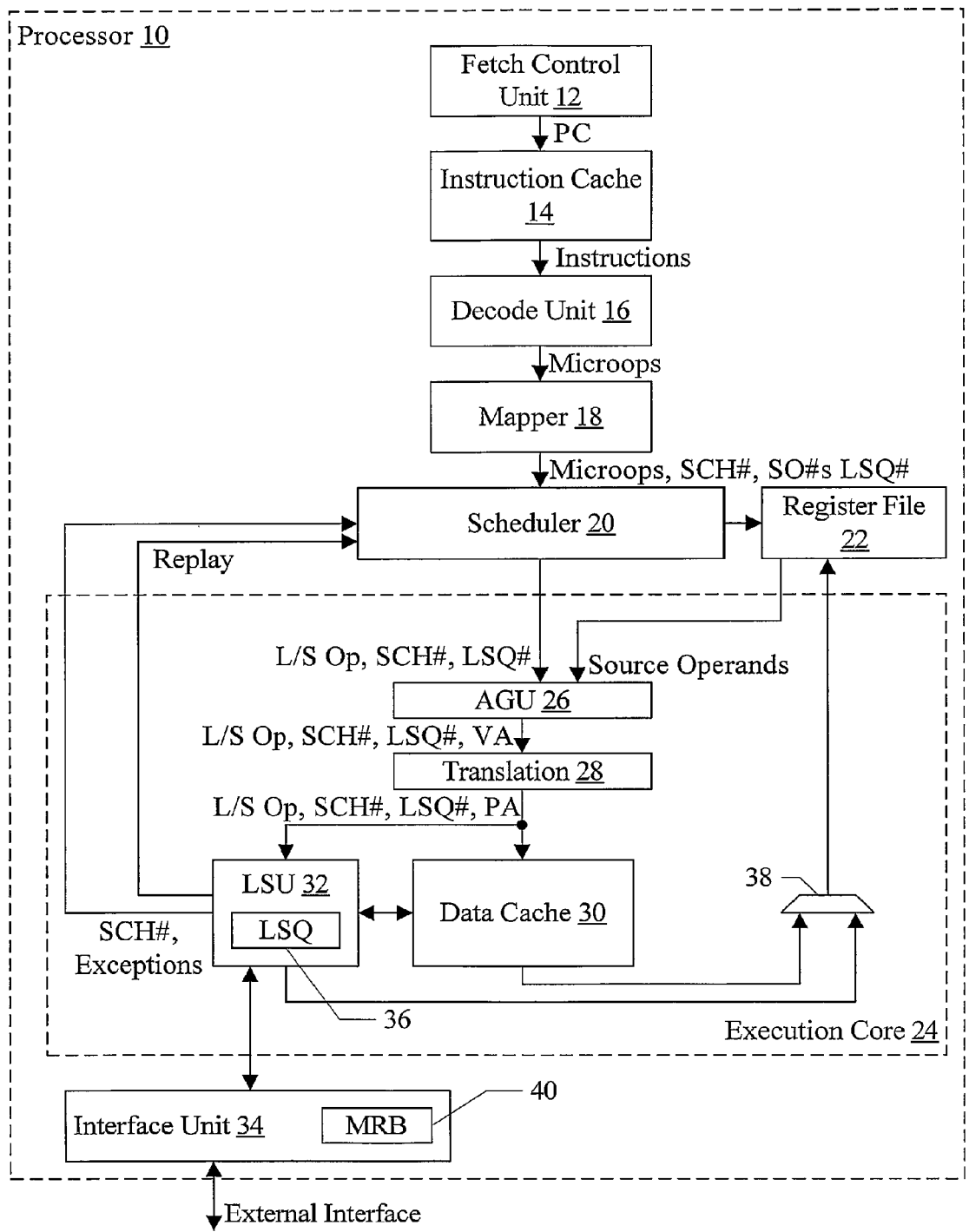
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A store instruction may generally include any instruction defined in the instruction set architecture implemented by the processor that causes a store memory operation. Thus, store instructions may include instructions that implicitly specify a store. Store instructions may also include explicit store instructions. A store, store operation, or store memory operation may include an operation generated within the processor that is to be executed by the processor to perform a store (or part of a store). Additionally, a store memory operation may be represented in a load/store queue or other pipeline stages, even if the manner in which it is represented differs substantially from the original form. Thus, a store memory operation may be referred to as stored in the load/store queue or other buffers, or may be referred to as passing through one or more pipeline stages.

In some embodiments, the processor may generate one or more micro-operations (microops) for each instruction defined in the instruction set architecture. In such embodiments, store microops may be generated. In other embodiments, microop generation may not be performed (e.g. most instructions in the instruction set architecture may be directly executed in the processor) and there may be a one-to-one correspondence between store instructions and store memory operations. A load instruction may similarly include any instruction defined in the instruction set architecture implemented by the processor that causes a load memory operation. A load, load operation, or load memory operation may include an operation generated within the processor that is to be executed by the processor to perform a load (or part of a load), including any representation thereof in a load/store queue or other buffer/pipeline stage.

An example implementation will be described in more detail below for an embodiment of a processor that implements an instruction set architecture that includes explicit load/store instructions. Particularly, the Power™ (formerly PowerPC™) instruction set architecture will be used as an example. Other instruction set architectures may be implemented in other embodiments, including instruction set architectures that include implicit memory operations. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc.

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. In the illustrated embodiment, the execution core 24 includes an address generation unit (AGU) 26, a translation unit 28, a data cache 30, and a load/store unit 32 (which includes a load/store queue 36). The fetch control unit 12 is coupled to provide a program counter (PC) for fetching from the instruction cache 14. The instruction cache 14 is coupled to provide instructions to the decode unit 16, which is coupled to provide microops to the mapper 18. The mapper 18 is coupled to provide microops, a scheduler number (SCH#), source operand numbers (SO#s), and a load/store queue number (LSQ#) to the scheduler 20. The scheduler 20 is coupled to receive a replay signal and a SCH# and exception indications from the load/store unit (LSU) 32, is coupled to the register file 22, and is coupled to provide load/store microops (L/S Op) for execution to the address generation unit 26 along with a SCH# and an LSQ#. The register file is coupled to provide operands to the address generation unit 26, and is coupled to receive results to be written to the register file 22 from a mux 38. The mux 38 is coupled to receive data from the data cache 30 and the LSU 32. The address generation unit 26 is configured to provide a virtual address (VA) to the translation unit 28, along with the L/S op, the SCH#, and the LSQ#. The translation unit 28 is configured to provide a corresponding physical address (PA) along with the L/S op, the SCH#, and the LSQ#, to the data cache 30 for access, and also provides the information to the LSU 32. The LSU 32 is coupled to the data cache 30 and the interface unit 34, which is further coupled to an external interface of the processor 10. The interface unit 34 includes a memory request buffer (MRB) 40

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations Generally, an instruction operation may be an operation that the hardware included in the execution core 24 is capable of executing. Each instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment.

Microops generated by the decode unit 16 may be provided to the mapper 18. The mapper 18 may implement register renaming to map source register addresses from the microops to the source operand numbers (SO#s) identifying the renamed source registers. Additionally, the mapper 18 may assign a scheduler entry to store each microop, identified by the SCH#. In one embodiment, the SCH# may also identify the rename register assigned to the destination of the microop. In other embodiments, the mapper 18 may assign a separate destination register number. The mapper 18 may assign an LSQ entry in the LSQ 36 to load/store memory operations. Thus, each load/store memory operation may have its entry in the LSQ 36 preassigned, prior to issuance. Other embodiments may assign the LSQ entry upon execution, or at some other point. The load/store operations may be issued out of order, in some embodiments, and the LSQ 36 may ensure ordering where appropriate (e.g. for load/store operations to the same address or overlapping addresses, when synchronization or in-order processing is required by the translation attributes, to preserve strong ordering characteristics, etc.).

The mapper 18 may provide the microops, along with SCH#, SO#s, and LSQ# (if applicable) for each microop to scheduler 20. The scheduler 20 may store the microops in the scheduler entries identified by the respective SCH#s, along with the SO#s and LSQ#. The scheduler 20 may schedule the microops for execution in the execution core 24. When a microop is scheduled, the scheduler 20 may read its source operands from the register file 22 and the source operands may be provided to the execution core 24. For load/store operations, the source operands include address operands used to generate the address of the memory location accessed by the load/store operation. Address operands of a load/store operation may include register operands provided from the register file 22 as well as displacement operands encoded in the load/store microop itself.

Load/store operations may be scheduled to the address generation unit 26, which generates the address of the load/store operation from the address operands. If address translation is enabled, the address generated by the address generation unit 26 may be an effective address or virtual address, to be translated to a physical address through the address translation mechanism. In the illustrated embodiment, the translation unit 28 may perform the address translation, generating the physical address. In other embodiments, the translation mechanism may be included in the data cache 30 or in parallel with the data cache 30. The translation unit 28 may comprise, for example, a translation lookaside buffer (TLB) that caches previously used translations. In one implementation that implements the Power instruction set architecture, the translation unit 28 may comprise an effective to real address translation (ERAT) table that caches the result of translating effective addresses to real (physical) addresses. In some embodiments, the translation unit 28 may also implement hardware to walk the translation tables (typically created by software and stored in memory) in the event of a miss for a translation in the TLB, ERAT, or other translation caching structure. Any translation hardware may be implemented in various embodiments.

The address from the translation unit 28 is provided to the data cache 30 and to the LSU 32. For load microops, the load data may be provided from either the data cache 30 or the LSU unit 32 through the mux 38. For example, the data may be provided by LSU 32 from the LSQ 36, if the load accesses bytes updated by a previous uncommitted store that is in the LSQ 36. The data may be provided from the data cache 30 if the load is a hit in the data cache 30 and the data is not provided from a previous uncommitted store in the LSQ 36. In some embodiments, the MRB 40 may be used as a store merge buffer for committed stores.

For store operations, the LSU 32 may write the store address and store data to the LSQ entry identified by the LSQ# provided with the store operation. Load operations may also be written to the LSQ 36 (e.g. for ordering purposes or to await fill data in the event of a cache miss). If any exceptions have been detected (by the translation unit 28 or other exception sources), the LSU 32 may transmit the SCH# of the operation and identify the exception(s) detected. In one embodiment, the LSU 32 may signal a lack of exceptions if none were detected, to provide a positive acknowledgement that an operation has reached the LSQ 36. In other embodiments, the scheduler 20 may track which operations are in the various pipeline stages of the execution core 24, and the SCH# may not be used to identify the exceptions. In one embodiment, stores may be eligible for retirement once exceptions have been reported for the stores.

In some cases, a memory operation may be replayed by the LSU 32. Generally, replay may cause the scheduler 20 to reschedule (reissue) the memory operation for execution. For example, if a load is executed out of order with respect to a previous store but accesses one or more bytes updated by the store, the load may be replayed in response to execution of the previous store. The scheduler 20 receives the replay signal, and may update its state to cause the replayed operation to be rescheduled at a later time. The scheduler 20 may also reschedule any subsequent microops, or subsequent microops that are dependent on the microop that is replayed. In one embodiment, the scheduler 20 may track which microops are in which pipeline stages in the execution core 24, and may thus associate the replay signal with the appropriate microop. In other embodiments, the replay signal may also identify the microop to the scheduler 20 or may be accompanied by an identifier (e.g. the SCH#).

In one embodiment, stores may be issued from the LSQ 36 to be completed by updating a target location (e.g. a data cache location in the data cache 30, or a location in the MRB 40). If a store is a hit in the data cache 30, the store could be completed by updating the data cache 30. However, in one embodiment, the data cache 30 is protected by an error correction code (ECC) scheme. Generally, the ECC scheme may involve generate ECC bits from the data bits, storing the ECC bits in the data cache 30 with the data bits, and checking the data using the ECC bits when the data is later accessed. The ECC bits are said to "cover" the data bits because the data bits are used to generate the ECC bits and the ECC bits can be used to identify errors in the data bits (e.g. random soft errors, and in some case hard failure errors). Each ECC bit may be defined to be the exclusive OR of a subset of the data bits, and the subsets corresponding to the ECC bits may overlap partially, in one implementation. Accordingly, to write store data to a cache block, a read-modify-write operation may generally be performed so that new ECC data can be generated based on the updated cache block.

In one embodiment, the ECC scheme may by implemented by dividing the cache block into non-overlapping sections. Each section is covered by one or more ECC bits, and is independent of the other sections. That is, each section has its own ECC bits that cover the data bits in that section and that have no affect on, and are not affected by, the data bits in another section. A given section is referred to as an ECC granule. A store which updates only complete ECC granules (that is, there are no partial granule updates) may be performed without a read-modify-write operation, since the corresponding ECC bits may be generated using the store data alone. A store that updates only complete ECC granules is referred to as an ECC granular store herein. In one embodiment, the ECC granule is 4 bytes (or a word, for Power instruction set architecture implementations). Thus, any aligned store that is word-sized or greater may be an ECC granular store. Misaligned larger stores may also be ECC granular (e.g. a double word store that is not double word aligned but is word aligned may still be ECC granular). Misaligned word stores and stores of less than a word are not ECC granular. Other embodiments may use larger or smaller ECC granules. In some embodiments, an ECC granule is less than the size of a cache block.

ECC granular stores that are a hit in the data cache 30 may be issued from the LSQ 36 and may update the data cache 30 (writing the store data and the corresponding ECC bits). Non-ECC granular stores and store misses may be written the MRB 40. Cache data may be read from the data cache, or data may be read from memory, and merged with the store data to create an ECC granular write. The ECC granular write may then be performed to the data cache 30.

In one embodiment, the processor 10 implements a strong ordering memory model. To ensure that the model is maintained, a store may not be made globally visible if it is subsequent to a load for which a snoop hit is detected and the snooped transaction indicates that the agent that initiated the transaction (e.g. another device on the external interface, or a device that is indirectly coupled to the external interface through, e.g., a bridge) is going to update the cache block affected by the snoop. For example, the snoop may indicate that the cache block is to be invalidated in the processor 10. If the store were permitted to become globally visible, it would appear to complete before the preceding load, which violates strong ordering rules. In the present embodiment, the store is globally visible when it is written the data cache 30 or the MRB 40.

However, for performance reasons, it is desirable to issue the store to the pipeline between the load/store unit 32 and the data cache 30/MRB 40 as soon as possible. To permit such operation, which effectively is a speculative issuance of the store into the pipeline, the LSQ 36 may detect the snoop hit on the load and may prevent the write of the store data corresponding to a subsequent store that has been issued into the pipeline. The subsequent store may be identified in the LSQ 36 as being subsequent to the load that is snoop hit (that is, the store need not be to the same address as the load, nor the same cache block, to be detected). The load/store unit 32 may signal the pipeline to prevent the write. For example, in one embodiment, a set of byte enables is provided for each store to indicate which bytes within a given byte range (e.g. an aligned doubleword, an aligned word, an aligned quadword, etc.) are written by the store. The byte enables within the pipeline that accompany the subsequent store may be cleared.

Thus, the update may effectively be prevented by having no bytes enabled for the update, even though the write operation may still occur. The snoop hit may be detected, and the byte enables cleared, before the write is attempted or coincident with the attempted write, in some embodiments.

In addition to maintaining the LSQ 36, the LSU 32 may have various other functions in some embodiments. For example, the LSU 32 may also enforce various load/store ordering rules, handle synchronization of memory operations as needed, participate in cache miss handling, etc. While a combined LSQ 36 has been described above, other embodiments may implement separate load and store queues.

The register file 22 may generally comprise any set of registers usable to store operands and results of microops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The interface unit 24 may generally include the circuitry for interface the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. The memory request buffer 40 may store various memory requests to be performed on the external interface, and may store snoops in some embodiments. Non-memory requests may also be stored in the MRB 40 (e.g. I/O requests).

Among other things, victim blocks evicted from the data cache 30 may be written to the MRB 40, to perform a writeback operation to memory to write the block. Blocks may be victimized to provide storage space for cache misses to be filled in. In many cases, the victim block may no longer be accessed and thus writing it back to memory has little effect on performance. In other cases, the block may be victimized because a large data set is being processed (or a data set have many cache blocks that would use the same cache locations in the data cache 30), and accesses to the victim block may still occur after the eviction.

In one embodiment, the interface unit 34 may detect stores to a victim block in the MRB 40, and may convert the writeback operation into a fill and write the data into the data cache 30 again. In such cases, a round trip latency to the main memory may be avoided for a cache block that is still being accessed by the program being executed on the processor 10 after it is evicted, in some embodiments. The stores may be in the MRB 40 at the time the victim block is presented to the MRB 40 from the data cache 30, or may be detected after the victim block is stored in the MRB 40. In the former case, the victim block data may be merged into the store data in the MRB 40. In the latter case, the store data may be merged into the victim block, and may be filled into the cache as part of the cache fill operation.

While the embodiment of FIG. 1 shows the execution core 24 including an address generation unit 26, a translation unit 28, a load/store unit 32, and a data cache 30, other embodiments may include any desired components. For example, multiple address generation units, translation units, load/store units, and/or data caches may be provided. Other units may be provided as well (e.g. one or more integer units, one or more floating point units, one or more graphics units, one or more cryptographic units, etc.). Generally, the execution core 24 may include any circuitry for executing instructions (or microops, in the illustrated embodiment).

It is noted that, while the illustrated embodiment uses a scheduler, other embodiments may implement other microarchitectures. For example, a reservation station/reorder buffer microarchitecture may be used. The reorder buffer may include a retire unit similar to the retire unit 44. If in-order execution is implemented, other microarchitectures without out of order execution hardware may be used.

Figure 2:
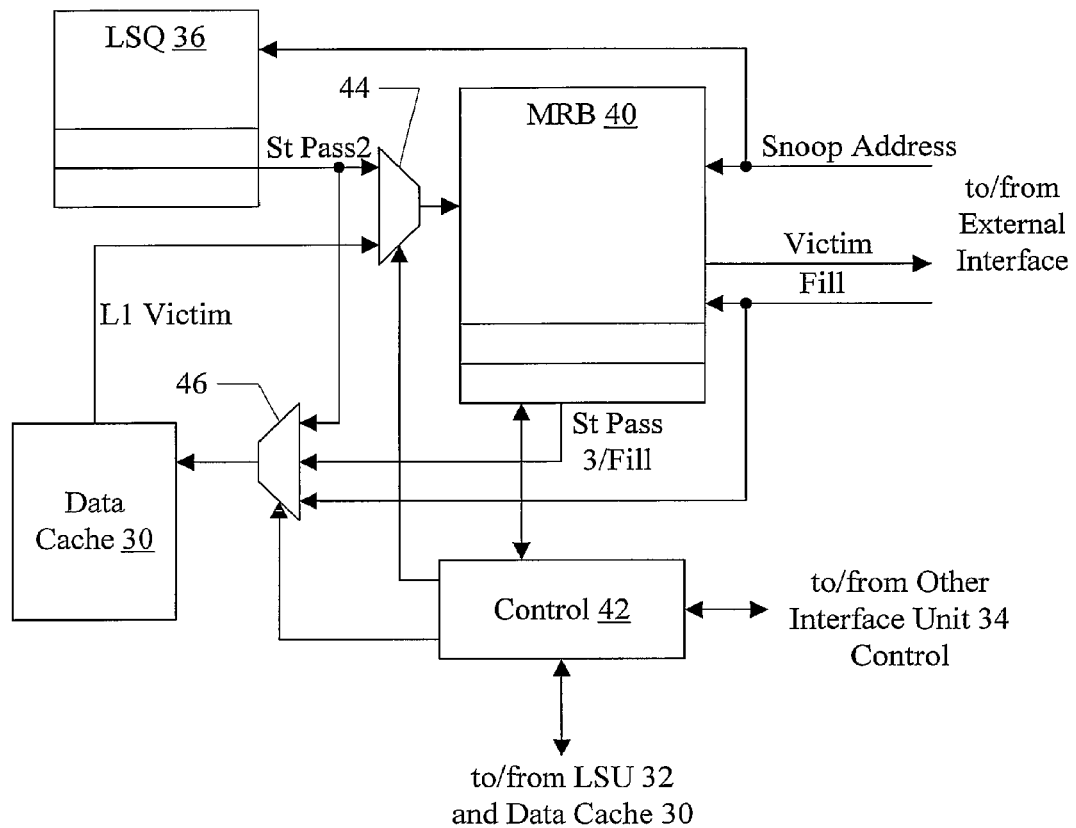
FIG. 2 is a block diagram illustrating a memory request buffer (MRB), a load/store queue (LSQ), and a data cache for one embodiment of a processor.

Turning now to FIG. 2, a block diagram of portions of the load/store unit 32, the interface unit 34, and the data cache 30 are shown. Boundaries between the LSU 32 and the interface unit 34 are not shown in FIG. 2. In one embodiment, the LSQ 36 is part of the LSU 32 and the MRB 40 and control unit 42 are part of the interface unit 34. The muxes 44 and 46 may also be part of the interface unit 34. As illustrated in FIG. 2, the LSQ 36 may be configured to issue a store for completion (St Pass2 in FIG. 2), which is one input of the mux 44 and the mux 46. The data cache 30 may also provide an L1 victim block writeback an another input to the mux 44. The output of the mux 44 is coupled to a write port of the MRB 40, and is coupled to receive a selection control from the control unit 42. In other embodiments, separate write ports for the victim and store may be provided on the MRB 40, and the mux 44 may be omitted. The mux 46 also receives a store pass3 or a fill from the MRB 40 as an input, and a fill from the external interface as an input. In one embodiment, bypassing of the fill into the data cache 30 may be supported. In other embodiments, only forwarding of the critical first data transfer of a fill (which may include the data that is a result of a load miss) is supported. In still other embodiments, no bypassing of data from the external interface may occur. The output of the mux 46 is provided to a write port on the data cache 30, and the mux 46 receives a selection control from the control unit 42. Other embodiments may include separate write ports on the data cache 30, and the mux 46 may be omitted. The control unit 42 is coupled to the MRB 40 and to communicate with the LSU 32, the data cache 30, and other interface unit 34 control circuitry. The MRB 40 is coupled to receive a fill and a snoop address from the external interface and to provide a victim block to the external interface (or more particularly to/from circuitry in the interface unit 34 that manages the external interface). The LSQ 36 is also coupled to receive the snoop address in this case, although other embodiments may queue the snoop in the MRB 40 or a separate snoop queue, and provide the snoop address from the buffer/queue to the LSQ 36.

The LSQ 36 may issue a store from one of its entries (responsive to control logic in the LSU 32). The store is referred to as "store pass 2" because the first pass through the pipeline of processor 10 is its initial execution. In the initial execution (pass 1), the store address is generated, the address is looked-up in the data cache to detect a hit, and the store is written to the entry in the LSQ 36. In pass 2, the store may be written to either the MRB 40 (non-ECC granular) through the mux 44 or to the data cache 30 (ECC granular) through the mux 46. In pass 3, a non-ECC granular store or store miss may be written to the data cache 30. Prior to being selected for pass 3, a non-ECC granular store that is a cache hit may have cache data read from the data cache 30 and merged into the store data to provide an ECC granular write to the data cache 30.

The communications illustrated in FIG. 2 may be pipelined (e.g., one example of the pipeline is illustrated in FIGS. 3-6 and described in more detail below). Stores may be issued speculatively after a load, as a store pass 2, and may have the corresponding write enables cleared while in the pipeline if a snoop hit is detected on the load in the LSQ 36. Pipeline storage devices (e.g. flops, registers, latches, etc.) are not illustrated in FIG. 2 for simplicity in the drawing.

Generally, the control unit 42 may generate the select controls for the muxes 44 and 46 via communications with the LSU 32, the data cache 30, and the interface unit 34. The LSU 32 may indicate that a store pass 2 is ready to issue, for example, and the data cache 30 may indicate that an L1 victim block is being evicted. The control unit 42 may also determine entries in the MRB 40 that are ready to issue (e.g. as store pass 3 operations or fills to the data cache 30).

It is noted that, in addition to providing fill data to the data cache 30, the output of the mux 46 may also provide fill data to the instruction cache 14 and translation data structures in the translation unit 28. Alternatively, separate data paths may be provided to the instruction cache 14 and/or the translation unit 28.

In one embodiment, the path to the data cache 30 from the mux 46 may address the data array of the data cache 30 (using the index and way for the entry allocated to the block being filled or updated). A tag lookup for another operation may be performed in parallel, in some embodiments.

Turning next to FIGS. 3-6, timing diagrams are shown for one embodiment of a load/store pipeline that may be implemented by one embodiment of the processor 10. Generally, a pipeline comprises a plurality of pipeline stages (or, more briefly, "stages") in which various portions of processing are performed. In FIGS. 3-6, clock cycles are delimited by vertical dashed lines, and are numbered at the top. Various actions that occur for stores at certain pipeline stages are shown in FIGS. 3-6 as well.

FIG. 3 illustrates the first pass of a store operation through the load/store pipeline, for one embodiment. In clock cycle 1, the scheduler issues the store operation for execution (Sch stage in FIG. 3). The scheduling of a microop may occur over several clock cycles, in some embodiments, and the Sch stage may represent the last of the stages. The register operands are read from the register file 22 in clock cycle 2 (RR stage). The address generation unit 26 executes the address generation during clock cycle 3 (AG stage) and the translation unit 28 translates the address during clock cycle 4 (TR stage). The data cache tags in the data cache 30 are accessed to determine hit/miss in the data cache 30 during clock cycle 5 (DT stage). Additionally, the DT stage is when the LSQ 36 is written with the store address, data, and any other state in this embodiment ("Write LSQ" in FIG. 2). The data cache data memory is accessed in clock cycle 6 (DC stage), although in this embodiment the data cache data memory may not be accessed during the first pass of the store operation (since the store data is not yet ready to be committed). Clock cycle 7 is the exception reporting stage (LW in FIG. 3), and the exceptions, if any, detected during execution of the store are reported to the scheduler 20 in this stage. Clock cycle 8 is the stage in which the scheduler 20 changes the status of the store operation to retired (assuming no exceptions are reported—Ret1 stage). In clock cycle 9, the store operation is selected for retirement (Ret2 stage), and in clock cycle 10 the scheduler 20 clears the scheduler entry assigned to the store operation (Ret3 stage). Thus, the scheduler entry becomes available to store another microop. Additionally, in the Ret3 stage, the scheduler 20 frees the LSQ entry assigned to the store operation in the mapper 18 ("Free LSQ#" in FIG. 2). Thus, subsequent to the Ret3 stage, the mapper 18 may reassign the LSQ entry to another load/store operation. In other embodiments, the store may not be retired until pass 2 and/or pass 3 occurs.

It is noted that, while the pipeline stages in FIG. 3 are illustrated as occurring in consecutive clock cycles, there may be intervening clock cycles in some cases. In one embodiment, an issued instruction executes through the portion of the pipeline implemented in the execution core 24 without stall (e.g. the RR, AG, TR, DT, DC, and Exc Rept stages). Additionally, the Ret1 state may occur without delay from the Exc Rept stage, in one embodiment. However, there may be a delay before the store operation is selected in the Ret2 stage (e.g. if earlier microops in the scheduler 20 have not yet been retired). Once the store operation is selected, the Ret3 stage may occur without delay from the Ret2 stage, in one embodiment.

Load operations may flow throw similar stages, and may be written to the LSQ 36 in clock cycle 5 and report exceptions in clock cycle 7. Additionally, in the event of a cache hit for the load, data may be forwarded to the destination register (and potentially to dependent operations) in clock cycle 7 (the load writeback, or LW, stage).

FIG. 4 illustrates the second pass of the store operation for an ECC granular store that is a hit in the data cache 30, for one embodiment. In the second pass, the store operation may pass through at least one pipeline stage that it passed through on the first pass. Particularly, in the illustrated embodiment, the store operation may pass through the DC stage (clock cycle N+1 in FIG. 3) to update the data cache data memory with the store data (and the corresponding ECC bits for the updated ECC granules). The load/store unit 32 may include circuitry to generate the ECC bits to be written with the store data, in this case.

In the illustrated embodiment, the store operation is selected for the second pass and the LSQ 36 is read to obtain the store operation state (address, data, etc.) in clock cycle N (LSQ read stage in FIG. 4). The store operation passes to the DC stage in clock cycle N+1. In clock cycle N+2, the LSQ entry may be invalidated.

The second pass of the store operation may overlap with the first pass, in some cases. For example, the second pass LSQ read stage (clock cycle N) may overlap with the first pass LW stage (clock cycle 7), in one embodiment, for the most rapid initiation of the second pass that is supported in the embodiment. That is, the second pass clock cycle N may occur no earlier than the first pass LW stage (clock cycle 7) in one embodiment. Such a rapid initiation of the second pass may occur, e.g., if the LSQ 36 is empty or the store operation is the oldest store operation in the LSQ 36 upon writing the store operation to the LSQ 36. The second pass may be initiated at any subsequent clock cycle, based on various factors such as position in the LSQ 36, ordering and synchronization constraints, availability of a pipeline hole, etc.

FIG. 5 illustrates the second pass of the store operation for a non-ECC granular store for one embodiment. An ECC granular store that is a miss in the data cache 30 may be similar. Since the non-ECC granular store uses at least some cache data (the data that completes the ECC granules that are partially updated by the store), the non-ECC granular store may be written to the MRB 40. Cache data may be read and merged with the store data in the MRB 40, or fill data may be read from memory and merged in the case of a cache miss. Accordingly, the second pass of such stores may be used to write the store from the LSQ 36 to the MRB 40. Particularly, in the illustrated embodiment, the store operation is selected for the second pass and the LSQ 36 is read to obtain the store operation state (address, data, etc.) in clock cycle N (LSQ read stage in FIG. 5). The store operation passes to the DC stage in clock cycle N+1, and to the LW stage in cycle N+2. In cycle N+3, the store operation is in the LW+1 stage and is written to the MRB.

FIG. 6 illustrates the third pass of a store operation (either non-ECC granular or ECC granular and a cache miss) for one embodiment. The third pass writes the store data, merged with cache data or fill data, to the data cache 30. The ECC bits for the store data may be generated in the MRB 40, for this embodiment. Alternatively, the ECC generation circuitry may be operable on the path from the MRB 40 to the data cache 30. The MRB may be read (clock cycle M), and the data may be written to the data cache (clock cycle M+1). If the store was a cache miss and thus a fill is being written, the tag may be updated as well and the third pass may use the DT stage as well. In clock cycle M+2, the LSQ entry for the store may be invalidated. Alternatively, the LSQ entry may be invalidated when the MRB is written, as illustrated in FIG. 5.

Figure 7:
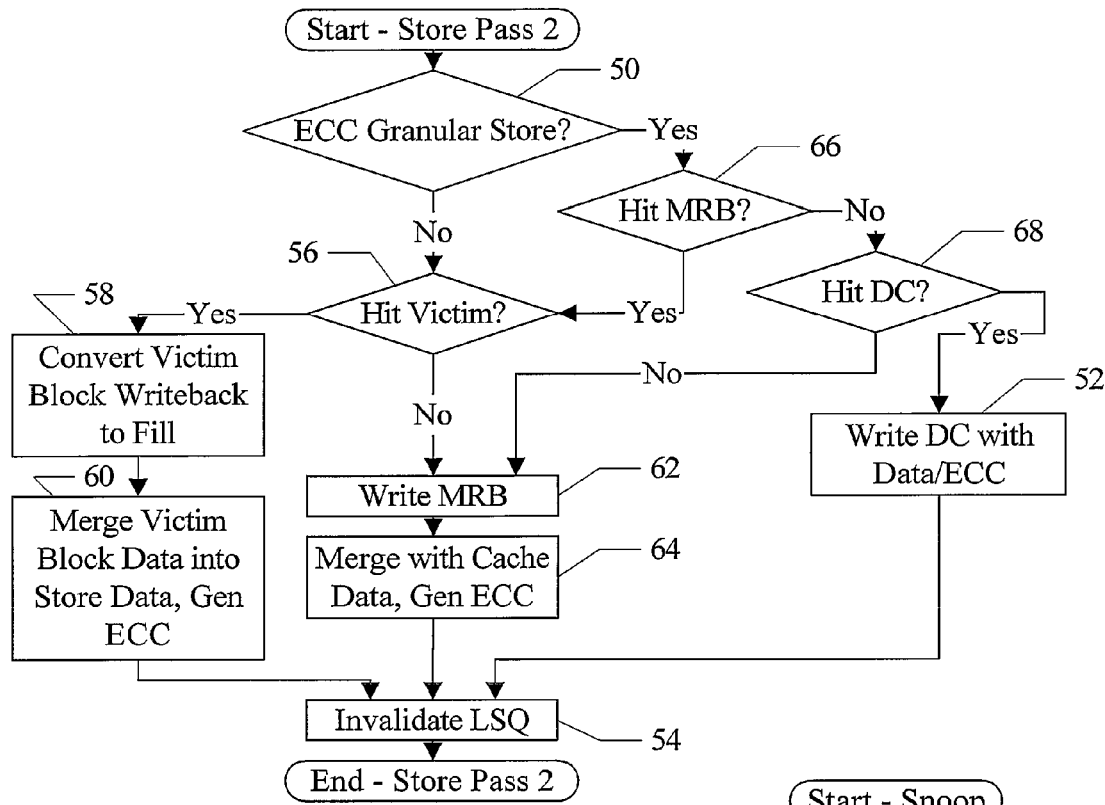
FIG. 7 is a timing diagram illustrating one embodiment of operation for a second pass of a store.

Turning now to FIG. 7, a flowchart is shown illustrating operation of one embodiment of the processor 10 for a second pass of a store operation. While the blocks are shown in a particular order for ease of understanding, other orders may be used. Blocks may be performed in parallel by combinatorial logic in the processor 10. Blocks, combinations of blocks, and/or the flowchart as a whole may be pipelined over multiple clock cycles. The operation of FIG. 7 may occur in response to a store operation being selected from the LSQ 36 for issue to the pipeline between the LSU 32 and the MRB 40/data cache 30. The pipeline may be part of the overall load/store pipeline, as illustrated in FIGS. 3-6.

If the store is ECC granular (decision block 50, "yes" leg), the control unit 42 may check the MRB 40 for a hit by the store (decision block 66). This check may ensure, if there are stores in the MRB 40 that update bytes which are also updated by the ECC granular store, that the data cache 30 is not updated by the ECC granular store before the earlier stores. If the update for the ECC granular store occurred, the subsequent update from the stores in the MRB would overwrite the ECC granular store updates. In other embodiments, this check may be handled in other fashions (e.g. in pass 1, by detecting a hit on a previous store in the LSQ 36 and/or the MRB 40). If the control unit 42 detects a miss on the MRB 40 (decision block 66, "no" leg), and the ECC granular store is a hit in the data cache 30 (decision block 68, "yes" leg), the control unit 42 may cause the store data and corresponding ECC bits to be supplied to the data cache 30 through the mux 46 from the LSQ 36 (block 52). Additionally, the LSU 32 may invalidate the LSQ entry that was assigned to the store (block 54). If the store is not ECC granular (decision block 50, "no" leg) or is a hit in the MRB 40 (decision block 66, "yes" leg), the interface unit 34 may detect if the store hits a victim block writeback queued in the MRB 40 (decision block 56). A store hits a victim block writeback if the store updates at least one byte of data in the victim block. If the store does hit the victim block writeback (decision block 56, "yes" leg), the victim block writeback operation may be converted into a fill in the MRB 40 (block 58). The store data may be written to the MRB 40, merging into the victim block data in the MRB 40 (block 60). The LSU 32 may invalidate the LSQ entry that was assigned to the store (block 54). If the non-ECC granular store or the ECC granular store that hits the MRB 40 does not hit a victim block writeback (decision block 56, "no" leg) or the ECC granular store does not hit the MRB 40 and also does not hit the data cache 30 (decision block 68, "no" leg), the control unit 42 may cause the store to be written to an MRB entry allocated to the store (block 62). Cache data may be read from the cache, and may be merged with the store data in the MRB 40 (block 64). ECC bits may be generated from the merged data to be written into the data cache 30 in the third pass. It is noted that, in one embodiment, two or more stores may be merged into one MRB entry (with corresponding cache data to complete ECC granules or the full cache block, as desired). The LSU 32 may invalidate the LSQ entry that was assigned to the store (block 54).

The MRB 40 includes a plurality of entries to store requests. Each entry may include a type field identifying the type of request (e.g. fill, store merge, snoop, writeback, etc.). Converting a victim block writeback to a fill may include changing the type field from writeback to fill. Subsequently, the victim block writeback (now fill) may be processed in the same fashion as other fills.

Figure 8:
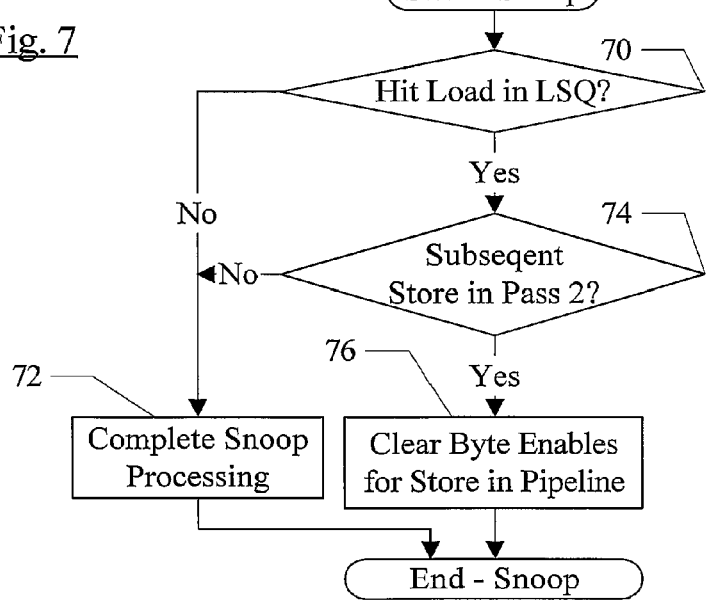
FIG. 8 is a timing diagram illustrating an embodiment of operation for a snoop.

Turning now to FIG. 8, a flowchart is shown illustrating operation of one embodiment of the processor 10 for a snoop. While the blocks are shown in a particular order for ease of understanding, other orders may be used. Blocks may be performed in parallel by combinatorial logic in the processor 10. Blocks, combinations of blocks, and/or the flowchart as a whole may be pipelined over multiple clock cycles.

If the snoop does not hit a load in the LSQ 36 (decision block 70, "no" leg), the processor 10 may complete snoop processing in other parts of the processor 10 (e.g. in the MRB 40, the data cache 30, etc.) (block 72). A snoop hitting a load in the LSQ 36 may include the snoop address matching (at a cache block granularity) the load address and the load having forwarded data to its destination register. Additionally, the snoop hitting the load may also include determining that the snoop indicates that a transaction by another agent in the system is to update the cache block. For example, the snoop may be an invalidating snoop that causes the processor 10 to invalidate the snooped cache block, if any, in the data cache 30. The invalidating snoop may or may cause the cache block to be written back by the processor 10, if the cache block is modified. If a snoop does hit a load in the LSQ 36 (decision block 70, "yes" leg), the LSU 32 may identify any subsequent stores that are in the second pass. If one or more subsequent stores are identified (decision block 74, "yes" leg), the LSU 32 may signal the pipeline to clear the byte enables for the store, thus preventing an update with the write data in either the MRB 40 or the data cache 30 (block 76). If no subsequent stores are identified (decision block 74, "no" leg), the processor 10 may complete any other snoop processing (block 72).

It is noted that the LSQ 36 may comprise a plurality of entries for load/store memory operations. The entry may include various state used to track the progress of the memory operation. For example, a store in pass 2 may be tracked via state in the entry for that store. Thus, the subsequent stores that are in pass 2 may be identified using the state in the LSQ 36. The state may be updated via known pipeline latencies, signalling from other units such as the data cache 30 and/or the control logic 42, etc. It is further noted that the operation illustrated in the flowchart of FIG. 8 may occur responsive to receiving a snoop from the interface, or responsive to scheduling a snoop from the MRB 40 or a separate snoop buffer for processing.

Figure 9:
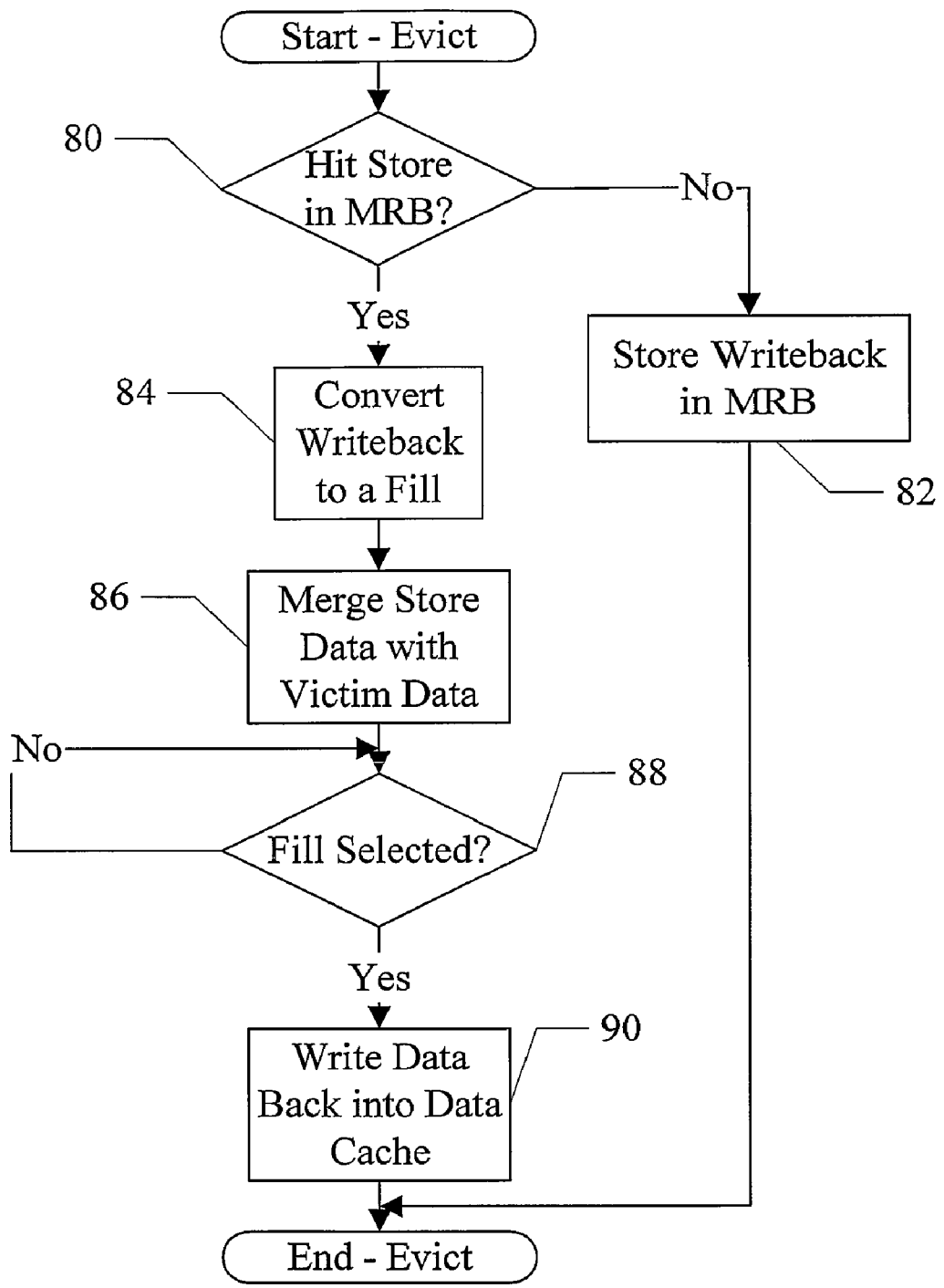
FIG. 9 is a timing diagram illustrating one embodiment of operation for a data cache evict.

Turning now to FIG. 9, a flowchart is shown illustrating operation of one embodiment of the processor 10 for a victim block evicted by the data cache 30. While the blocks are shown in a particular order for ease of understanding, other orders may be used. Blocks may be performed in parallel by combinatorial logic in the processor 10. Blocks, combinations of blocks, and/or the flowchart as a whole may be pipelined over multiple clock cycles.

If the victim block does not hit one or more stores in the MRB 40 (decision block 80, "no" leg), the interface unit 34 may write the victim block writeback into the MRB 40 (block 82). If the victim block does hit at least one store (decision block 80, "yes" leg), the interface unit 34 may convert the writeback to a fill (block 84) and may merge the victim block data into the store data in the MRB 40 (block 86). ECC data for the updated block may also be generated. Alternatively, the ECC data may be generated as the fill data is transmitted to the data cache 30 for storage. The control unit 42 may select the fill (decision block 88, "yes" leg) and the fill data may be written to the data cache 30 (block 90). During the time that the converted victim block writeback awaits selection to write into the data cache 30, a snoop may cause the fill to be written out to memory (not shown in FIG. 9).

Numerous variations and modifications will become apparent to those skilled in the art once the above disclosure is fully appreciated. It is intended that the following claims be interpreted to embrace all such variations and modifications.

What is claimed is:

1. A processor comprising:
    a data cache; and
    an interface unit comprising a memory request buffer coupled to receive a victim block evicted by the data cache to be written back to memory, wherein the interface unit is configured to initialize a type field associated with the victim block to a writeback type responsive to writing the victim block to the memory request buffer, and wherein the interface unit is configured to convert the victim block writeback into a cache fill for the data cache responsive to detecting at least one store memory operation to the victim block, wherein the interface unit is configured to convert the victim block writeback by changing the type field associated with the victim block to indicate a cache fill type.

2. The processor as recited in claim 1 wherein the interface unit is configured to return the victim block to the data cache as the cache fill responsive to the cache fill type in the type field associated with the victim block.

3. The processor as recited in claim 1 wherein the store memory operation is received at the memory request buffer subsequent to receiving the victim block at the memory request buffer.

4. The processor as recited in claim 3 wherein the interface unit is configured to merge the store data into the cache block data in the memory request buffer.

5. The processor as recited in claim 1 wherein the memory request buffer is further coupled to receive an additional cache fill request corresponding to a load memory operation that missed in the data cache, wherein the memory request buffer is configured to store the additional cache fill request awaiting transmission to memory to read data from the memory, and wherein the interface unit is configured to initialize the type field corresponding to the additional cache fill request to the cache fill type.

6. The processor as recited in claim 5 wherein the interface unit is configured to return a second cache fill to the data cache to write data into the data cache, wherein the second cache fill corresponds to the additional cache fill request, and wherein the interface unit is configured to return the second cache fill to the data cache responsive to the interface unit receiving the data on an interface to which the interface unit is coupled.

7. The processor as recited in claim 6 wherein the data is received on the interface responsive to transmitting the additional cache fill request on the interface.

8. The processor as recited in claim 7 wherein the interface unit is configured to return the victim block to the data cache as the cache fill responsive to the cache fill type in the type field and without transmitting a corresponding cache fill request on the interface.

9. A method comprising:
    a memory request buffer receiving a victim block evicted by a data cache to be written back to memory;
    setting a type field associated with the victim block to a writeback type responsive to writing the victim block to the memory request buffer;
    detecting at least one store memory operation to the victim block; and
    changing the type field associated with the victim block to indicate a cache fill type responsive to the detecting.

10. The method as recited in claim 9 further comprising returning the victim block to the data cache as the cache fill responsive to the cache fill type in the type field associated with the victim block.

11. The method as recited in claim 9 further comprising receiving the store memory operation at the memory request buffer subsequent to receiving the victim block at the memory request buffer.

12. The method as recited in claim 11 further comprising merging the store data into the cache block data in the memory request buffer.

13. The method as recited in claim 9 further comprising:
    the memory request buffer receiving an additional cache fill request corresponding to a load memory operation that missed in the data cache;
    storing the additional cache fill request in the memory request buffer awaiting transmission to memory to read data from the memory; and
    setting the type field corresponding to the additional cache fill request to the cache fill type.

14. The method as recited in claim 13 further comprising returning a second cache fill corresponding to the additional cache fill request to the data cache to write data into the data cache responsive to receiving the data on an interface, wherein the data is received on the interface responsive to transmitting the additional cache fill request on the interface.

15. The method as recited in claim 14 further comprising returning the victim block to the data cache as the cache fill responsive to the cache fill type in the type field and without transmitting a corresponding cache fill request on the interface.

* * * * *